United States Patent [19]

Golas et al.

[11] E Re. 30,343

[45] Reissued Jul. 22, 1980

[54] METHOD AND SINGLE PIECE ANNULAR NOZZLE TO PREVENT ALUMINA BUILDUP DURING CONTINUOUS CASTING OF Al-KILLED STEEL

[75] Inventors: Eugene A. Golas, Middle Township, Bucks County; Shri N. Singh, Penn Township, Westmoreland County, both of Pa.

[73] Assignee: United States Steel Corporation, Pittsburgh, Pa.

[21] Appl. No.: 21,147

[22] Filed: Mar. 16, 1979

Related U.S. Patent Documents

Reissue of:

[64] Patent No.: 4,117,959
Issued: Oct. 3, 1978
Appl. No.: 794,290
Filed: May 5, 1977

U.S. Applications:

[63] Continuation-in-part of Ser. No. 715,603, Aug. 18, 1976, abandoned.

[51] Int. Cl.[2] ..... B22D 41/08
[52] U.S. Cl. ..... 222/590; 222/591
[58] Field of Search ..... 222/590, 591, 600, 1; 164/437

[56] References Cited

U.S. PATENT DOCUMENTS

| | | | |
|---|---|---|---|
| 2,252,635 | 8/1941 | Karr | 222/591 X |
| 3,470,941 | 10/1969 | Thompson | 222/591 X |
| 3,663,730 | 5/1972 | Gates | 222/591 X |
| 3,779,424 | 12/1973 | Shapland, Jr. | 222/600 X |

FOREIGN PATENT DOCUMENTS

| | | | |
|---|---|---|---|
| 1472266 | 1/1967 | France | 222/591 |
| 48-92226 | 11/1973 | Japan | 222/591 |
| 1295169 | 11/1972 | United Kingdom | 222/591 |

OTHER PUBLICATIONS

Singh, S. N., "Mechanism of Alumina Buildup in Tundish Nozzles During Continuous Casting of Aluminum-Killed Steels," *Metallurgical Transactions;* vol. 5, Oct. 1974, pp. 2165-2178.

*Primary Examiner*—David A. Scherbel
*Attorney, Agent, or Firm*—John F. Carney

[57] ABSTRACT

A pour passage of particular configuration for controlling the flow of aluminum-killed steels, or the like, is described which is effective for preventing the accumulation of oxide inclusions in an orifice opening disposed in the pour passage. The described pour passage configuration may be formed in a replaceable nozzle insert that is mountable in the pour opening of a molten metal teeming vessel or in the slidable panel of a sliding gate valve operably associated with the vessel. A method of preventing inclusion accumulation in a control orifice opening when pouring aluminum-killed steels or the like is also described.

17 Claims, 4 Drawing Figures

METHOD AND SINGLE PIECE ANNULAR NOZZLE TO PREVENT ALUMINA BUILDUP DURING CONTINUOUS CASTING OF Al-KILLED STEEL

Matter enclosed in heavy brackets [ ] appears in the original patent but forms no part of this reissue specification; matter printed in italics indicates the additions made by reissue.

This application is a continuation-in-part of U.S. application Ser. No. 715,603, filed Aug. 18, 1976, now abandoned.

BACKGROUND OF THE INVENTION

In the production of steel product, such as billets, slabs and blooms, by the continuous casting method, molten steel is poured into a mold from the bottom of a teeming vessel such as a ladle or a tundish that is operably positioned above the mold. In order to control product quality it is necessary that the level of the molten metal in the mold be maintained substantially constant. For this reason, it has been the practice to interpose a metering nozzle in the pour passage between the teeming vessel and the mold. Such metering nozzles are normally replaceably disposed in the bottom of the vessel and consist of a bore including an upper portion formed with either a conically tapered or spherically formed wall that terminates at its bottom in a flow restricting orifice formed of a diameter to produce the desired rate of molten metal flow into the mold.

In the continuous casting of steels deoxidized by aluminum, magnesium, titanium or rare earth compounds, collectively referred to herein as "aluminum-killed" steels, there is a tendency for alumina or other refractory oxide inclusions of microscopic proportions to accumulate in the pour passage through the metering nozzle. These inclusions accumulate in the flow restricting orifice causing the flow opening to constrict thereby adversely affecting caster operation by initially requiring the speed of the caster to be reduced in order to maintain the required metal level in the mold, and finally, requiring replacement of the orifice when the constriction becomes excessive. If the nozzle is fixed in the teeming vessel, the casting operation must be terminated in order to replace the nozzle. If the nozzle forms part of a sliding gate valve, several gate changes may be required during the pouring of a single cast in order to replace the contained nozzles.

The problem is more acutely manifest in low production facilities, i.e., those in which caster operation compels the use of metering nozzles containing orifice openings of less than one inch diameter. In these facilities the production of aluminum-killed steel product in a continuous casting operation cannot be accomplished on a practical commercial basis due to the rapid obstruction of the small diameter orifice openings and the attendant frequency of nozzle replacements that result.

It has been contemplated to alleviate the described problem by cementing a thin disc containing the flow control orifice in the bottom of the pour opening of the teeming vessel. Such a device, known as a "wafer nozzle", is shown and described in Japanese patent application Ser. No. 24208/72 which was laid open on Nov. 11, 1973, under Ser. No. 92226/73. Applicants have found, however, that "wafer nozzles" are not totally dispositive of the problem for several reasons. First, such devices which are normally formed of a refractory material of greater density than the surrounding refractory of the vessel lining are prone to rapidly deteriorate due to the imposition thereon of high thermal stresses. Secondly, the flow of metal through these nozzles is often disturbed, principally as a result of turbulent fluctuations in the molten metal bath within the teeming vessel, thereby producing instability of the flow stream through the orifice opening and flaring in the stream emerging therefrom. An unstable flow stream gives rise to some, albeit reduced as compared with other devices of the prior art, inclusion accumulation on the nozzle. Moreover, both of these characteristics present the danger of causing metal oxidation due to increased exposure of the metal to air.

It is to the alleviation of this problem, therefore, that the present invention is directed.

SUMMARY OF THE INVENTION

Accordingly, the present invention provides means forming a pour passage of particular configuration in a vessel for teeming molten metal, especially aluminum-killed steels of fine grain structure. The pour passage contains a flow-restricting orifice opening disposed in a relatively thin, flat disc-like member that projects radially from the wall of the passage intermediate the ends thereof. The portions of the pour passage disposed above and below the orifice-containing member are formed of diameters that are greater than that of the orifice opening. That portion disposed above the member is preferably formed of a diameter greater than that of the portion subjacent thereto.

According to the preferred aspect of the invention the pour passage is formed in a nozzle insert that can be replaceably mounted in the refractory lining of the teeming vessel or in the slide panel of a slide gate valve that is commonly employed in such installations.

It is accordingly a principal object of the present invention to provide means for improving the productivity of casting operations in which aluminum-killed steels are poured.

Another object of the present invention to provide a pour passage for the controlled flow of molten metal from a teeming vessel that can operate for prolonged periods even when aluminum-killed steels are poured.

Still another object of the invention to provide a replaceable insert for a teeming vessel for pouring molten metal that is configured to reduce or eliminate the accumulation of oxide inclusions in the flow passage.

A further object of the invention is to provide a molten metal pour passage of the described type that is not prone to excessive thermal stressing and that is capable of achieving stable discharge flow thereby protecting the metal flow stream from oxidation due to exposure to the atmosphere that would otherwise result due to flaring of the flow stream.

A still further object of the invention is to provide a pour passage of the described type having means for damping turbulent effects in the molten metal bath within the teeming vessel in order to produce a more stable flow stream through the orifice opening.

For a better understanding of the invention, its operating advantages and the specific objectives obtained by its use, reference should be made to the accompanying drawings and description which relate to a preferred embodiment thereof.

DESCRIPTION OF THE PREFERRED EMBODIMENTS OF THE INVENTION

Figure 1:
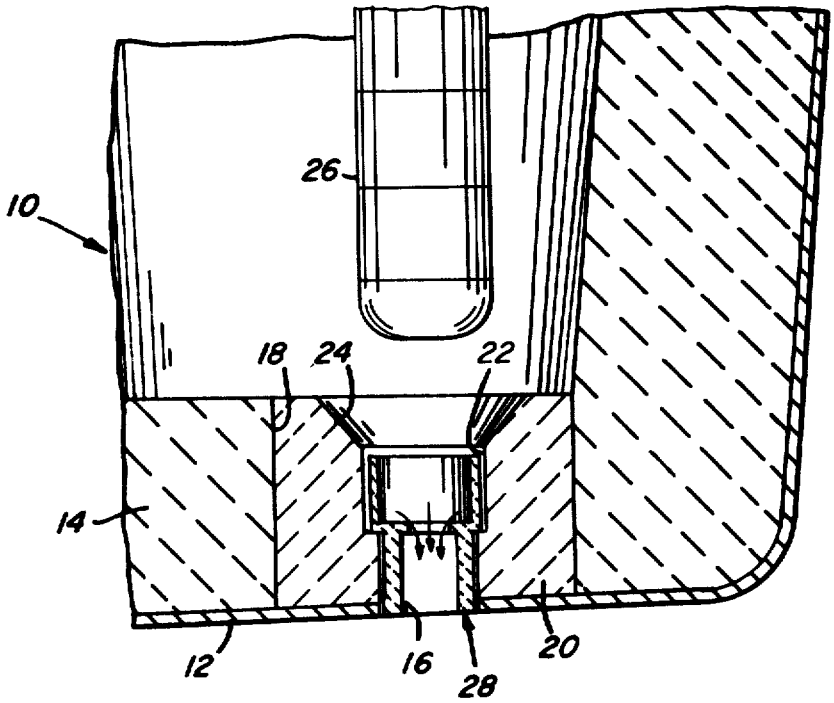
FIG. 1 is a partial vertical sectional view of a bottom-pour teeming vessel equipped with a pour nozzle constructed according to the present invention.

For purpose of describing the invention there is shown, in FIG. 1 of the drawings, the lower side portion of a teeming vessel 10 of generally well known construction that is adapted to hold molten metal. The vessel 10 comprises a metal shell 12 having a refractory lining 14, each of which are provided at their bottom with appropriate aligned openings, 16 and 18 respectively, to accommodate means for bottom-pouring molten metal from the vessel. A generally cylindrical well block 20 is disposed in the lining opening 18 and has a through-bore 22 which terminates at its upper end in an upwardly facing conical recess 24. The bore 22 communicates with the vessel interior and forms part of the molten metal pour passage from the vessel. In the illustrated embodiment and in applications in which it is desired to intermittently open or close the pour passage, a stopper rod 26, of usual construction, can be operably arranged for seating engagement at its lower end in the well block for opening and closing the pour passage.

Figure 2:
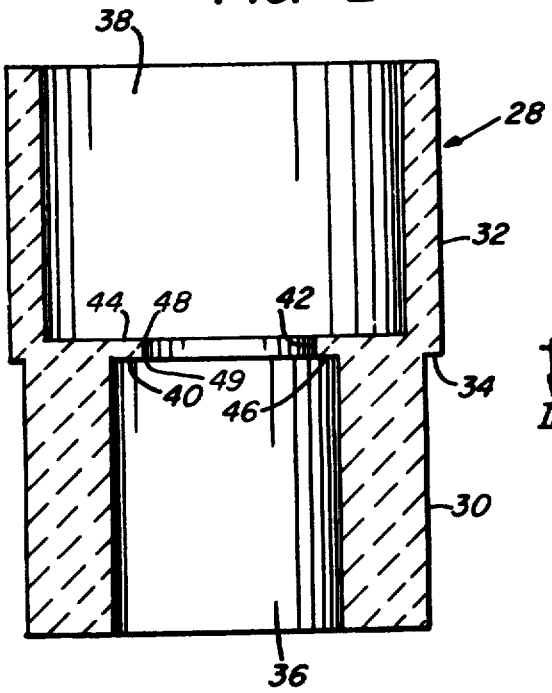
FIG. 2 is an enlarged elevational view of a nozzle insert constructed according to the present invention.
Figure 3:
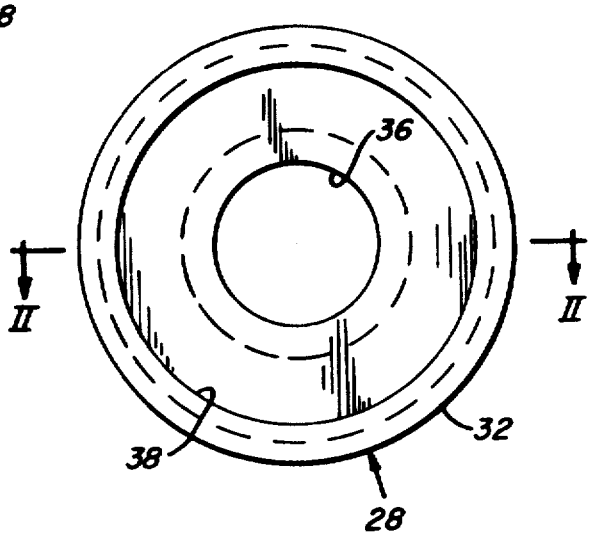
FIG. 3 is a plan view of the nozzle insert of FIG. 3.

A refractory nozzle insert 28 constructed according to the present invention is provided with means for mounting in the well block bore 22. As shown best in FIGS. 2 and 3, the nozzle insert 28 comprises a body of generally hollow cylindrical configuration. The external wall of the body is formed with a lower portion 30 that is of somewhat reduced diameter as compared with the upper portion 32 to thus define an annular stepped shoulder 34 intermediate the ends of the insert for seating on a conplementary shoulder in the wall block 20. It should be understood, however, that means other than the illustrated stepped shoulder can alternatively be provided for mounting the insert 28 within the vessel. Fixture of the nozzle insert 28 in the well block 20 is preferably accomplished by cementing or the like (not shown).

The body of the insert 28 is provided with an axial bore having a lower portion 36 and an upper portion 38 which cooperate to define the metal pour passage from the teeming vessel. An annular, relatively thin-walled disc-like member 40 is integrally formed in the pour passage of the insert, projecting radially from the passage wall and transversely of the axis thereof. As shown, the member 40 is disposed intermediate the ends of the bore, forming the divider between the lower and upper bore portions, 36 and 38 respectively. A through-opening 42 penetrates the member 40 forming a flow restricting orifice therethrough.

The member 40 is formed as thin as practicable but in any event should be provided with a thickness no greater than twice the diameter of the orifice opening 42 therein. The upper surface 44 of the member 40 is formed such that the inlet edge 40 of the orifice opening 42 is a sharp edge. In the preferred embodiment the surface 44 is formed substantially normal to the bore axis of the opening 42 and at right angles to the wall thereof. The wall of the orifice opening 42 may, if desired, be downwardly divergent, however, if such a configuration is adopted the inlet edge 48 will be more prone to rapid erosion and, for this reason, is not deemed desirable for most applications.

It will be appreciated that, in forming the pour passage through which molten metal, especially aluminum-killed steels, flow from a teeming vessel as described herein certain advantages are derived. First, because the restricting orifice, i.e., orifice opening 42, is disposed in a thin, disc-like member in the manner described, the danger of obstructing the control flow passage by oxide inclusions is, for practical purposes, eliminated. This advantage is derived from the fact that, in a thin disc, i.e., one having an L/D ratio no greater than 2, the imposition of a sharp edge defining the inlet to the orifice opening causes the stream of flowing metal to constrict, as indicated by the flow lines in FIG. 1, by the formation of what is commonly termed the "vena contracta". Constriction of the flow lines is enhanced by the fact that the surface 44 is disposed normal to the axis of the orifice opening 42 whereby the fluid flow approaching the opening is imparted with a significant component of velocity radially inwardly toward the axis of the opening. Since the wall of the orifice opening is shorter in length than the distance within which the constricted flow stream will return to its normal diameter there will be no contact made by the flowing metal on the wall and, concomitantly, no boundary layer will be formed adjacent the wall within which inclusions can accumulate. In order to insure the creation of the "vena contracta" the outer periphery of the upper surface 44 of the member 40 which is normal to the bore axis should be formed of a diameter not less than about 1.4 times that of the opening 42, preferably not less than about twice the diameter thereof. Additionally, due to the thinness of the member 40 that contains the restricting orifice 42, the material about the orifice opening is rapidly brought up to the temperature of the molten metal whereupon excessive heat losses which otherwise might produce material "freezing" to the opening is avoided.

A further advantage derived from the fact that the upper bore portion 38 is formed as a right circular cylinder superposed above the member 40 is that there is established a well-like plenum positioned immediately upstream of the orifice opening 42. This plenum serves a two-fold purpose. First, it operates to dampen any turbulent fluctuations that may occur in the bath of molten metal within the teeming vessel as a result, for example, of the pouring of additional metal into the teeming vessel from a supply ladle, or the like. The plenum can produce such damping and thus eliminate the disruptive effect turbulence within the bath has upon the maintenance of the "vena contracta" in the stream of molten metal flowing through the orifice opening as long as the diameter of the bore portion 38 does not exceed three times its depth. Preferably this depth-to-diameter ratio should be about two.

Secondly, the plenum defined by the wall of the bore portion 38 at its intersection with the surface 44 of member 40 provides a space in the lower region of the bore portion surrounding, but adequately remote from, the orifice opening 42 in which the flow of metal is relatively stagnant whereupon oxide inclusions will tend to be deposited. By sizing this region of the flow passage as taught herein the space so provided is of ample volume to receive the deposited inclusions without their entering or otherwise interfering with the opening 42 during the practical life of the device.

As shown, the lower bore portion 36 in the described arrangement is formed of a diameter that is somewhat reduced as compared with that of the upper portion 38. By sizing this portion of the bore in the manner shown adequate material is provided beneath the member 40 with which to provide bottom support thereto. The wall of this bore portion should not, however, be located so close to the lower edge 49 of the orifice opening 42 as to provide a surface which will be in contract with the stream of molten metal exiting the orifice opening.

Figure 4:
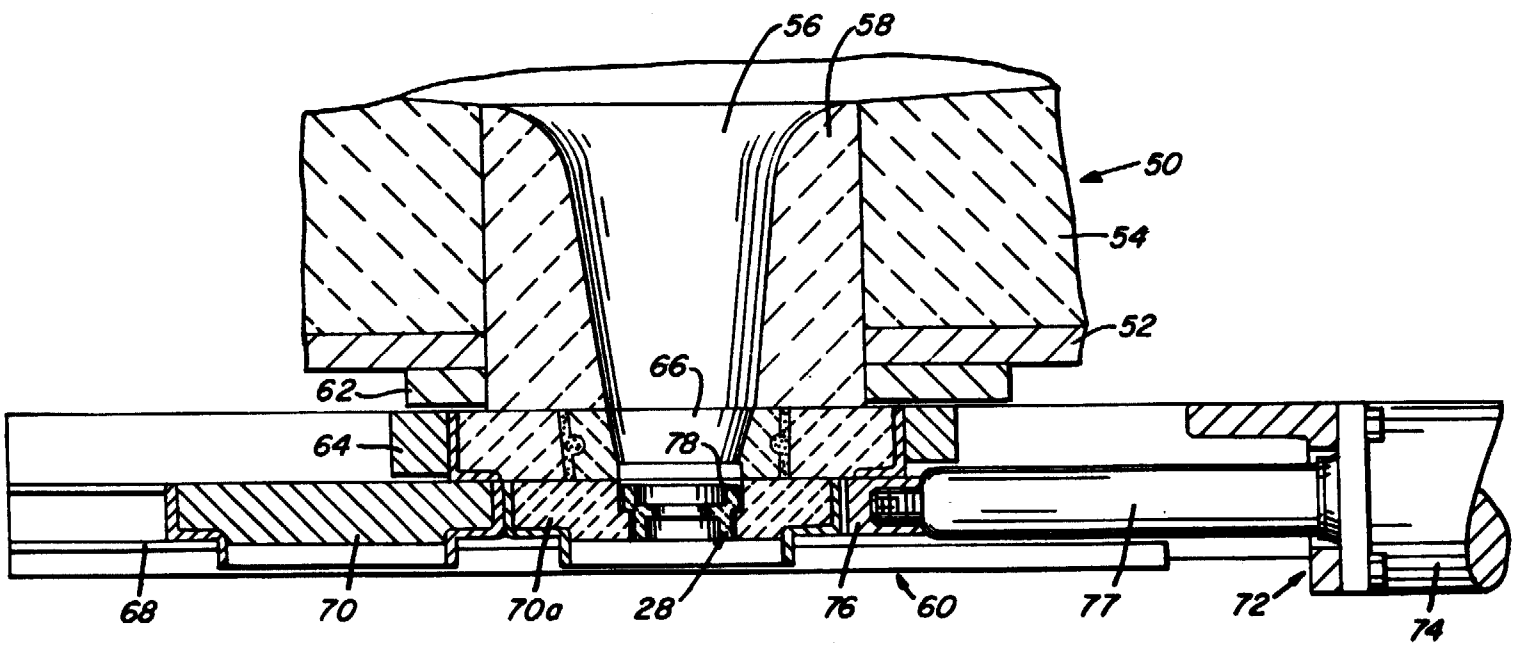
FIG. 4 is a partial vertical sectional view of a bottom-pour tundish vessel having a slide gate flow control valve equipped with a nozzle insert constructed according to the present invention.

FIG. 4 of the drawing illustrates a preferred application of the nozzle insert 28 of the present invention applied in a slide gate valve installation on a tundish vessel 50 utilized in conjunction with a continuous casting installation. The vessel 50 whose bottom portion is shown in the figure comprises a shell 52 having a refractory lining 54. The metal pour passage from the vessel is formed by the bore 56 in well block 58. A slide gate valve apparatus, indicated generally as 60, is attached to the vessel bottom by means of a mounting plate 62. A slide gate apparatus of the type contemplated is more fully described in U.S. Pat. No. 3,779,424 to E. P. Shapland, Jr. and assigned to the assignee of this application. To the extent necessary for an understanding of this invention the apparatus may be described as having a stationary top plate 64 provided with an opening 66 aligned with the well block bore 56 and a pair of oppositely spaced parallel rails 68 mounted beneath the top plate for slidably guiding metal encased refractory panels or gates 70 or 70a. The gates 70 and 70a are adapted to be indexed in sequence from a position beneath the top plate opening 66 by means of a hydraulic operator 72 consisting of fluid motor 74, ram 76 and actuating rod 77. Some of the gates, indicated as 70, are blank, having no opening from the passage of molten metal and serve when in position to prevent the flow of metal from the tundish 50. Others, indicated as 70a, are provided with an axial bore 78 forming the pour passage of metal from the vessel. As shown in FIG. 4, the slide gate 70a has its bore 78 formed of stepped diameters defining a shoulder for mounting a nozzle insert 28 therein of similar configuration as that described in connection with FIGS. 1, 2 and 3 above.

Heats of steel of 200-ton size containing 0.03 to 0.05 weight-percent aluminum have been cast in a continuous caster from a vessel equipped with a slide gate valve having a nozzle insert as described herein whose orifice opening is of one and three-eighths inch diameter. The casting operation has been characterized by a substantially constant casting speed through-out the entire casting period, typically of sixty minutes or more duration. In contrast, use of a conventional flow nozzle in an identical installation exhibited rapid decrease in casting speed (a drop of 12 to 15 inches per minute in casting speed during a casting period of only ten minutes duration). The improved performance in the former installation is attributed to the fact that the accumulation of oxide inclusions is minimized by use of the nozzle insert.

It will be understood that various changes in the details, materials and arrangements of parts which have been herein described and illustrated in order to explain the nature of the invention, may be made by those skilled in the art within the principle and scope of the invention as expressed in the appended claims.

What is claimed is:

1. A method of preventing the accumulation of oxide inclusions on the flow surface of an orifice opening in a flow nozzle operably disposed in the pour passage of a teeming vessel for pouring a bath of aluminum-killed steels or the like comprising the steps of:

(a) forming said orifice opening of an axial length shorter than that of the "vena contracta" of the molten metal stream flowing therethrough; and (b) providing a plenum about said orifice opening on the upstream side thereof defining a region in which the flow of molten metal is sufficiently stagnant to damp the vibrational effects imposed on the metal bath whereby the stream flowing through said orifice opening is stabilized.

2. A refractory article of manufacture [adapted to provide a passage for pouring] *defining a nozzle for metering the flow of* molten metal from a bottom pour teeming vessel comprising:

(a) a body having a substantially cylindrical axial bore therethrough defining a metal pour passage;

(b) a disc-like member having a planar upper surface extending substantially perpendicular to the axis of said bore;

(c) an axial opening through the planar surface of said member of a diameter less than the diameter of said bore to define a flow control orifice; and (d) said disc-like member having an axial thickness no greater than about twice the diameter of said orifice and having said upper surface axially spaced from the inlet end of said bore to define a bore portion upstream of said orifice formed of a depth-to-diameter dimensional ratio operative to define a region of flow stagnation capable of damping turbulent fluctuations in said vessel to stabilize the flow stream through said orifice.

3. The article as recited in claim 2 in which the planar surface of said disc-like member is of a diameter no less than about 1.4 times the diameter of said axial opening.

4. The article as recited in claim 2 in which said upstream bore portion is formed of a depth-to-diameter ratio of no less than about one-third.

5. The article as recited in claim 2 in which said upstream bore portion is of a diameter no greater than about five times the diameter of said orifice.

6. The article as recited in claim 5 in which said upstream bore portion is of a diameter about twice that of said orifice.

7. The article as recited in claim 2 in which said disc-like member is disposed intermediate the ends of said bore to define a bore portion on the downstream side of said member.

8. The article as recited in claim 7 in which said upstream bore portion is of a diameter greater than the portion of said bore on the downstream side of said member.

9. The article as recited in claim 2 in which said disc-like member is integrally formed in said body.

10. The article as recited in claim 2 including means on said body exteriorly of said bore for operatively mounting said body with respect to said teeming vessel.

11. The article as recited in claim 10 in which said body is formed as a hollow body of revolution and said mounting means comprises an annular shoulder about the external surface of said body.

12. A refractory article of manufacture [adapted to provide a passage for pouring] *defining a nozzle for metering the flow of* molten metal from a bottom pour teeming vessel, comprising:

(a) a body formed generally as a hollow body of revolution having a generally cylindrical axial bore therethrough defining a metal pour passage;

(b) a disc-like member having a planar upper surface and an axial opening therethrough of a diameter less than the diameter of said bore to define a flow control orifice;

(c) said planar surface having a peripheral diameter no less than about 1.4 times the diameter of said orifice; and (d) said member having an axial thickness no greater than about twice the diameter of said orifice and having the upper surface of said member axially spaced from the inlet end of said body to define a bore portion upstream of said orifice formed of a depth-to-diameter ratio of no less than about one-third.

13. The article as recited in claim 12 in which said upstream bore portion is of a diameter no greater than about five times the diameter of said orifice.

14. The article as recited in claim 13 in which said upstream bore portion is of a diameter about twice that of said orifice.

15. The article as recited in claim 12 in which said disc-like member is disposed intermediate the ends of said bore to define a bore portion on the downstream side of said member.

16. The article as recited in claim 12 in which said disc-like member is integrally formed in said body.

17. The article as recited in claim 12 including means forming an annular shoulder about the external surface of said body for operatively mounting said body with respect to said teeming vessel.

* * * * *